(12) United States Patent
Ota

(10) Patent No.: US 8,872,954 B2
(45) Date of Patent: Oct. 28, 2014

(54) IMAGE PROCESSING APPARATUS HAVING FEATURE EXTRACTION AND STORED IMAGE SELECTION CAPABILITY, METHOD OF CONTROLLING THE APPARATUS, PROGRAM THEREOF, AND STORAGE MEDIUM

(75) Inventor: Tomohiro Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 670 days.

(21) Appl. No.: 12/784,028

(22) Filed: May 20, 2010

(65) Prior Publication Data
US 2010/0321529 A1    Dec. 23, 2010

(30) Foreign Application Priority Data
Jun. 22, 2009   (JP) ................................ 2009-147948

(51) Int. Cl.
| | |
|---|---|
| H04N 5/222 | (2006.01) |
| H04N 5/76 | (2006.01) |
| H04N 1/21 | (2006.01) |
| H04N 5/77 | (2006.01) |
| H04N 1/00 | (2006.01) |
| H04N 101/00 | (2006.01) |

(52) U.S. Cl.
CPC ........... *H04N 1/2112* (2013.01); *H04N 1/2158* (2013.01); *H04N 5/77* (2013.01); *H04N 1/00442* (2013.01); *H04N 1/0045* (2013.01); H04N 2201/0084 (2013.01); H04N 2101/00 (2013.01)
USPC .................................. 348/333.02; 348/231.3

(58) Field of Classification Search
USPC ........................ 348/231.3, 333.02, 169, 143
See application file for complete search history.

(56) References Cited

U.S. PATENT DOCUMENTS

| | | | |
|---|---|---|---|
| 5,831,670 A | 11/1998 | Suzuki | |
| 6,850,639 B2 * | 2/2005 | Song et al. | 382/162 |
| 7,133,597 B2 * | 11/2006 | Tingey et al. | 386/239 |
| 7,254,311 B2 * | 8/2007 | Nagasaka et al. | 386/241 |
| 7,308,119 B2 | 12/2007 | Gohda et al. | |
| 7,414,658 B2 * | 8/2008 | Ariga | 348/333.11 |
| 7,595,816 B1 * | 9/2009 | Enright et al. | 348/150 |

(Continued)

FOREIGN PATENT DOCUMENTS

| | | |
|---|---|---|
| JP | 2001-215404 | 8/2001 |
| JP | 2003-274226 | 9/2003 |

(Continued)

OTHER PUBLICATIONS

Apr. 15, 2013 Japanese Office Action, that issued in Japanese Patent Application No. 2009-147948.

*Primary Examiner* — Lin Ye
*Assistant Examiner* — Amy Hsu
(74) *Attorney, Agent, or Firm* — Cowan, Liebowitz & Latman, P.C.

(57) ABSTRACT

An image processing apparatus for retrieving and displaying image data related to an object included in image data, and a method of controlling the apparatus, whereby the image processing apparatus obtains image data, extracts feature data of an object in the image data, retrieves, from image data stored in a storage medium, image data having feature data similar to the extracted feature data, selects image data to be displayed from a plurality of items of retrieved image data, based on additional data of each of the plurality of retrieved image data, and displays the selected image data together with the obtained image data.

23 Claims, 10 Drawing Sheets

(56) References Cited

U.S. PATENT DOCUMENTS

| | | | |
|---|---|---|---|
| 8,035,687 B2* | 10/2011 | Nishiyama | 348/169 |
| 8,184,155 B2* | 5/2012 | Ke et al. | 348/142 |
| 8,339,451 B2* | 12/2012 | Wang et al. | 348/130 |
| 2004/0201752 A1* | 10/2004 | Parulski et al. | 348/231.99 |
| 2004/0223057 A1* | 11/2004 | Oura et al. | 348/207.1 |
| 2005/0007468 A1* | 1/2005 | Stavely et al. | 348/239 |
| 2005/0157184 A1* | 7/2005 | Nakanishi et al. | 348/220.1 |
| 2006/0077263 A1* | 4/2006 | Hosoda | 348/222.1 |
| 2006/0210264 A1 | 9/2006 | Saga | |
| 2007/0120970 A1* | 5/2007 | Goffin | 348/14.16 |
| 2008/0068456 A1* | 3/2008 | Fujii et al. | 348/130 |
| 2008/0211936 A1* | 9/2008 | Ichimasa | 348/241 |
| 2008/0279425 A1* | 11/2008 | Tang | 382/118 |
| 2009/0015676 A1* | 1/2009 | Ke et al. | 348/169 |
| 2009/0237546 A1* | 9/2009 | Bloebaum et al. | 348/333.01 |
| 2009/0237547 A1* | 9/2009 | Misawa et al. | 348/333.01 |

FOREIGN PATENT DOCUMENTS

| | | |
|---|---|---|
| JP | 2004-312244 A | 11/2004 |
| JP | 2004-312495 A | 11/2004 |
| JP | 2005-157763 | 6/2005 |
| JP | 2005-157764 | 6/2005 |
| JP | 2005-352780 A | 12/2005 |
| JP | 2006-295888 | 10/2006 |
| JP | 2007-174378 A | 7/2007 |

* cited by examiner

IMAGE PROCESSING APPARATUS HAVING FEATURE EXTRACTION AND STORED IMAGE SELECTION CAPABILITY, METHOD OF CONTROLLING THE APPARATUS, PROGRAM THEREOF, AND STORAGE MEDIUM

BACKGROUND OF THE INVENTION

1. Field of the Invention

The present invention relates to an image processing apparatus for retrieving and displaying image data related to objects included in image data, and to a method of controlling the apparatus.

2. Description of the Related Art

A technique for identifying a specific object person from imaged or recorded image data has been proposed, primarily for biometric purposes (Japanese Patent Laid-Open No. 2005-157764). Japanese Patent Laid-Open No. 2005-157763 discloses a technique for displaying a list of images based on feature data of an identified object person. Japanese Patent Laid-Open No. 2006-295888 discloses a technique that involves an imaging apparatus comparing feature data of a previewed specific object person with image data recorded in the past, and displaying shooting history information based on the comparison result. Japanese Patent Laid-Open No. 2001-215404 and Japanese Patent Laid-Open No. 2003-274226 disclose techniques for recognizing or classifying the composition of images.

It is desirable, when wanting to shoot a specific object person in various compositions or when always shooting a specific object person in the same composition such as with shooting a golf swing, to be able to easily reference image data of the specific object person shot in the past. Also, it is desirable, when creating still image data from recorded moving image data or when trimming recorded still image data to create new still image data, to be able to reference other image data that includes the object person while working. With Japanese Patent Laid-Open No. 2005-157763, display of a list of images is performed based on feature data of an object person, but there is no provision for referencing image data of a specific object person during shooting or during the process of creating still image data. Also, with Japanese Patent Laid-Open No. 2006-295888, shooting history information is derived and displayed, but image data of a specific object person cannot be referenced during display or shooting. That is, heretofore, referencing image data recorded in the past while shooting an image or while in the process of creating image data with regard to an object person in image data that is subsequently to be processed had not previously been conceived.

SUMMARY OF THE INVENTION

An aspect of the present invention is to eliminate the above-mentioned problems with the conventional technology.

A feature of the present invention is to retrieve past image data related to an object included in obtained image data, and simultaneously display the retrieved image data and the obtained image data, thereby enabling image data related to the object to be referenced before the obtained image data is processed.

According to an aspect of the present invention, there is provided an image processing apparatus comprising:

an obtaining unit that obtains image data;

an extraction unit that extracts feature data of an object from the image data obtained by the obtaining unit;

a storage control unit that performs control to store image data into a storage unit;

a retrieval unit that retrieves, from image data stored in the storage unit, image data having feature data similar to the feature data extracted by the extraction unit;

a selection unit that selects, from a plurality of items of image data retrieved by the retrieval unit, image data to be displayed, based on additional data of each of the plurality of items of retrieved image data, and a display control unit that displays the image data selected by the selection unit together with the image data obtained by the obtaining unit.

According to another aspect of the present invention, there is provided a method of controlling an image processing apparatus comprising:

obtaining image data;

extracting feature data of an object from the image data obtained in the obtaining step;

performing control to store image data into a storage medium;

retrieving, from image data stored in the storage medium, image data having feature data similar to the feature data extracted in the extraction step;

selecting, from a plurality of items of image data retrieved in the retrieval step, image data to be displayed, based on additional data of each of the plurality of items of retrieved image data, and a display control step of displaying the image data selected in the selection step together with the image data obtained in the obtaining step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, and serve to explain the principles of the invention.

DESCRIPTION OF THE EMBODIMENTS

Embodiments of the present invention will now be described in detail, with reference to the accompanying drawings. It is to be understood that the following embodiments are not intended to limit the claims of the present invention, and that not all combinations of aspects that are described according to the following embodiments are necessarily required with respect to the means to solve the problems according to the present invention.

First Embodiment

A first embodiment will be described in the case where image data to be displayed is not grouped.

Figure 1:
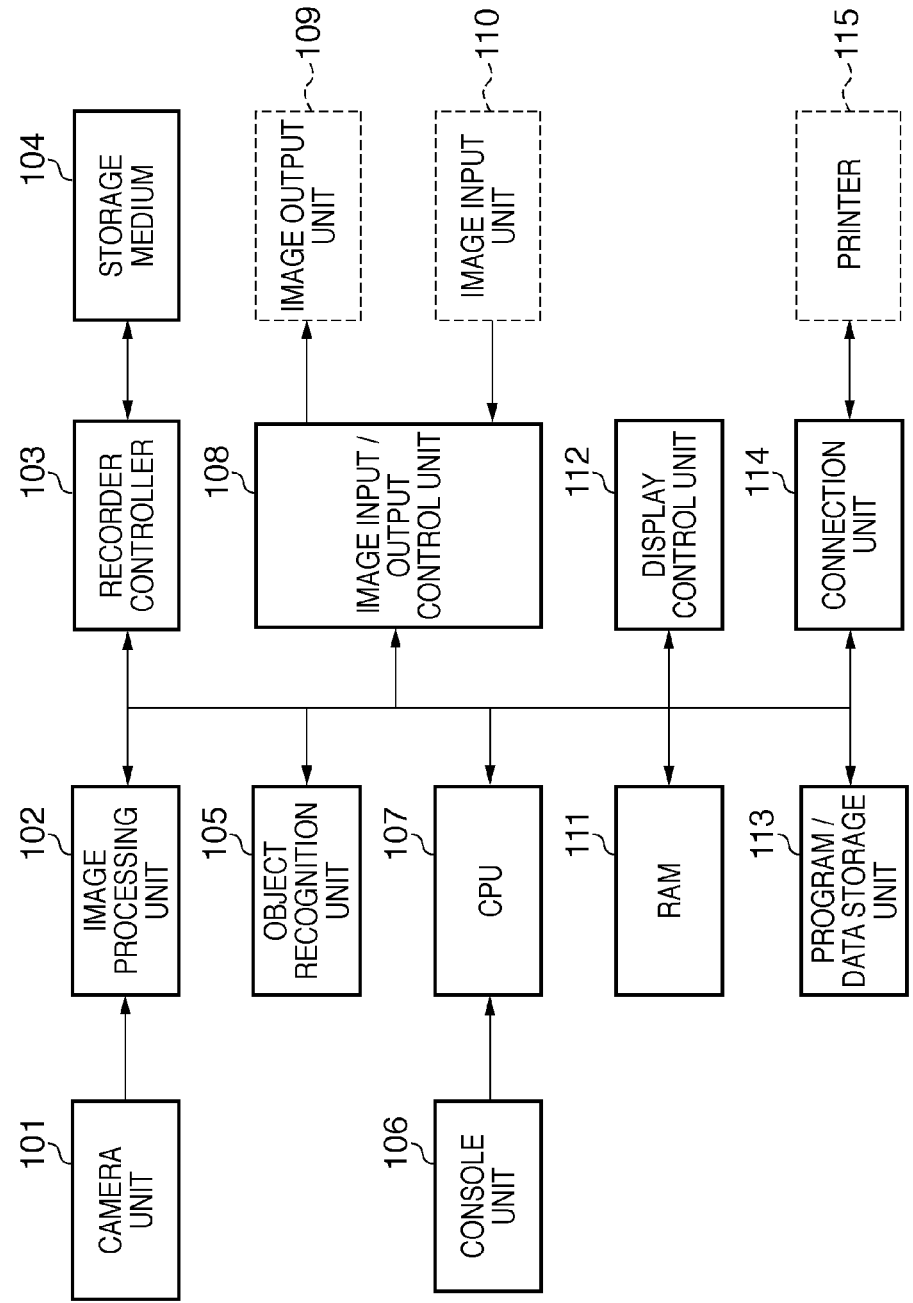
FIG. 1 is a block diagram illustrating a configuration of an image processing apparatus according to a first embodiment.

FIG. 1 is a block diagram illustrating a configuration of an image processing apparatus according to the first embodiment.

The ultimate object of this image processing apparatus is to create new image data from moving image data or still image data. This operation involves shooting in the case where image data is input from a camera unit 101 serving as an imaging unit, and moving image capture or still image trimming in the case where image data is input from a storage medium 104 or an image input unit 110. New image data created with this image processing apparatus is saved to the storage medium 104, output to an image output unit 109 (for example, a display unit), or printed by a printer 115 connected to a connection unit 114.

The operation of this image processing apparatus is controlled by a CPU 107 reading out necessary programs and data from a program/data storage unit 113, and executing these programs. User operations are input to the CPU 107 via a console unit 106, and this image processing apparatus is thereby instructed to perform various operations, change operating conditions, and the like. Control of and data processing by the various blocks (units) are respectively performed by an image processing unit 102, a recorder controller 103, an object recognition unit 105, an image input/output control unit 108, a display control unit 112, and the connection unit 114. A RAM 111 is used as a work area and a buffer by the CPU 107 and the various control blocks. Note that the image input unit 110 and the printer 115 indicated with broken lines are both external devices connected to this image processing apparatus, and exchange data with the image processing apparatus. The image output unit 109 serves as a display device for preview images and for display screens according to the embodiments, and as an output destination for newly created image data, and may be a block (unit) incorporated in this image processing apparatus or an apparatus connected externally to the image processing apparatus. The display unit 112 controls the image output unit 109 to display an image and the like in accordance with an instruction of the CPU 107. The object recognition unit 105 determines the number of objects, feature data of each object in an image and analyzes composition of the image.

Firstly, a process of copying data for comparing feature data of an object person obtained from a preview image to a search table in the RAM 111 will be described. In the case where only image data recorded after the apparatus has been powered on is targeted for display, however, this process is redundant, since image data is added to the search table in the RAM 111 whenever shooting is performed.

Figure 2:
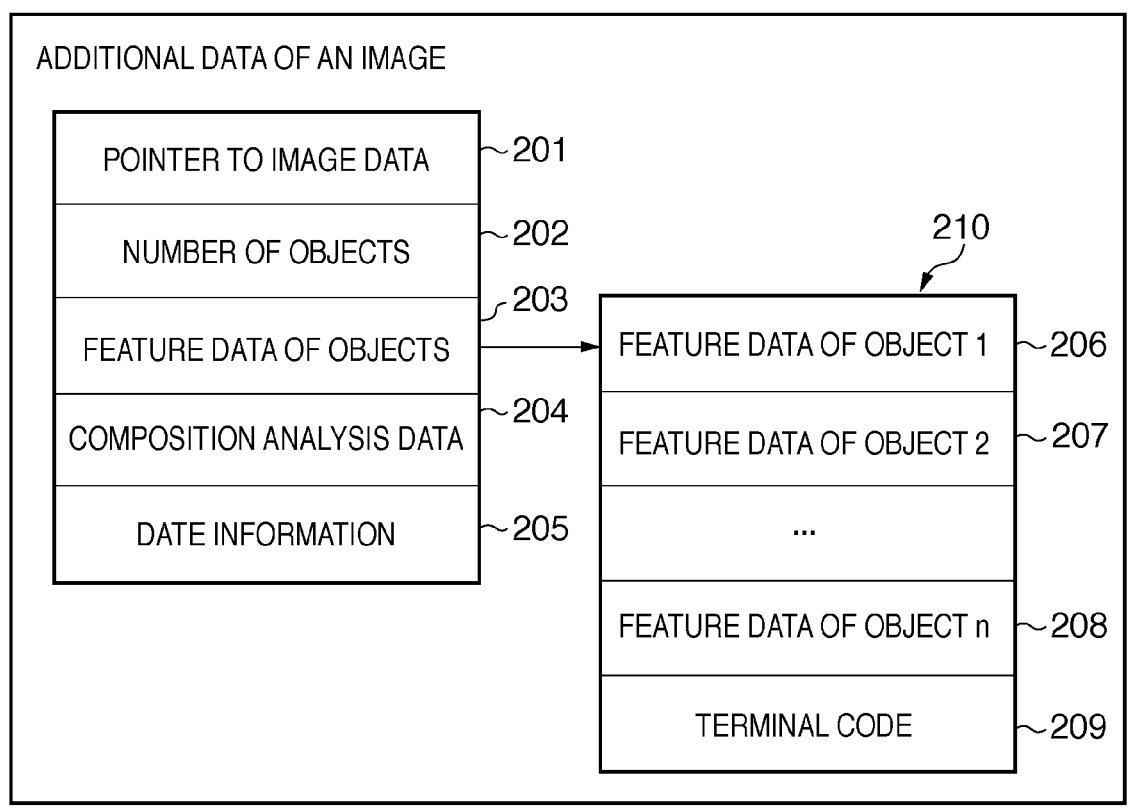
FIG. 2 depicts a view illustrating a configuration of additional data of image data stored on a storage medium.

FIG. 2 illustrates a configuration of additional data of a single image data recorded on the storage medium 104.

Each of a plurality of items of image data stored on the storage medium 104 holds additional data as represented in FIG. 2. A pointer 201 indicates an address in the storage medium 104 at which the image data is stored. The number of object persons 202 indicates the number of object persons included in this image data. Feature data 203 indicates the start address of a feature data table 210 storing feature data of each object person, for however many object persons are included in this image data. Composition analysis data 204 represents the composition of this image data. Date information 205 indicates the date on which the image data was created.

The feature data table 210 includes feature data 206 to 208 equal to the number (n) of object persons included in the image data. These feature data 206 to 208 are respectively for identifying the object persons, and the data size thereof is common to all object persons. Therefore, feature data equal to the number (n) of object persons can be easily extracted. A terminal code 209 is an end code indicating the end of this feature data table 210. Note that the date information 205 of shooting or the like is typically recorded in EXIF (Exchange Image File format) in an image file in the case of recent digital still cameras.

Figure 3:
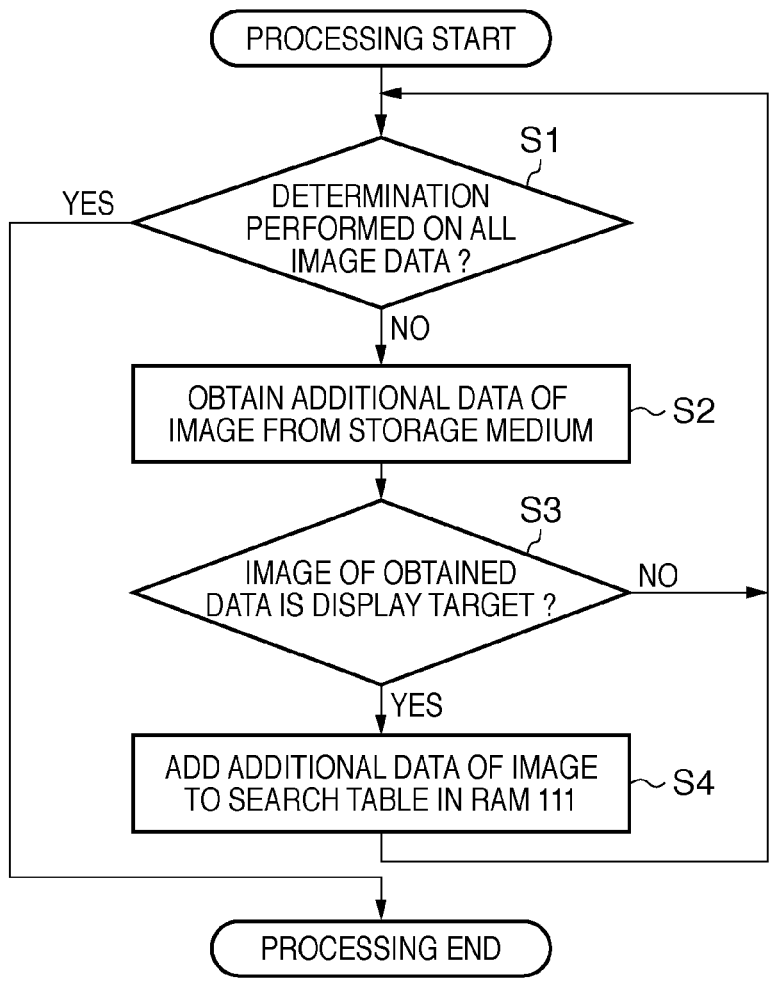
FIG. 3 is a flowchart describing a process performed by the image processing apparatus of reading out additional data and copying the read additional data to a search table.

FIG. 3 is a flowchart describing a process performed by the image processing apparatus according to the first embodiment of reading out additional data from the storage medium 104, and copying the read additional data to the search table in the RAM 111. A program for executing this processing is stored in the program/data storage unit 113, and executed under the control of the CPU 107.

Firstly, in step S1, it is determined whether there is image data whose additional data has yet to be read out in the storage medium 104. If not, the processing is determined to have ended, and this processing is ended. On the other hand, when it is determined that there is image data whose additional data has not been read out in the storage medium 104, the processing proceeds to step S2, and the additional data of an image is read out from the storage medium 104. Next, in step S3, it is determined whether the read additional data is the additional data of image data targeted for display. In the case where, for example, the display target is limited by the date on which image data was recorded, it is determined whether this image data is a display target, with reference to the date information 205 included in the read additional data. If it is determined in step S3 not to be a display target, the processing returns to step S1, and if it is determined to be a display target in step S3, the processing proceeds to step S4, and this additional data is added to the search table in the RAM 111. This series of processes is performed on all image data recorded in the storage medium 104.

Figure 4:
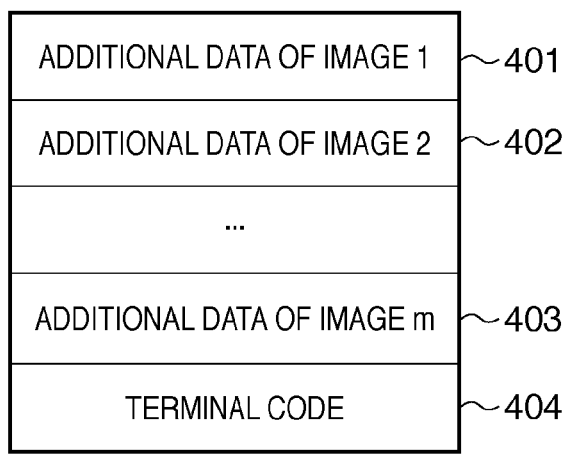
FIG. 4 depicts a view illustrating a data configuration of a search table created in RAM.

FIG. 4 depicts a view illustrating a data configuration of the search table created in the RAM 111 as a result of the processing shown with the flowchart in FIG. 3.

Additional data 401 of an image 1, additional data 402 of an image 2 and additional data 403 of an image m are arranged in order from the leading data, and a terminal code 404 representing the terminus is placed at the end. Note that the data structure of the additional data of the image data is the aforementioned data structure shown in the FIG. 2.

Figure 5:
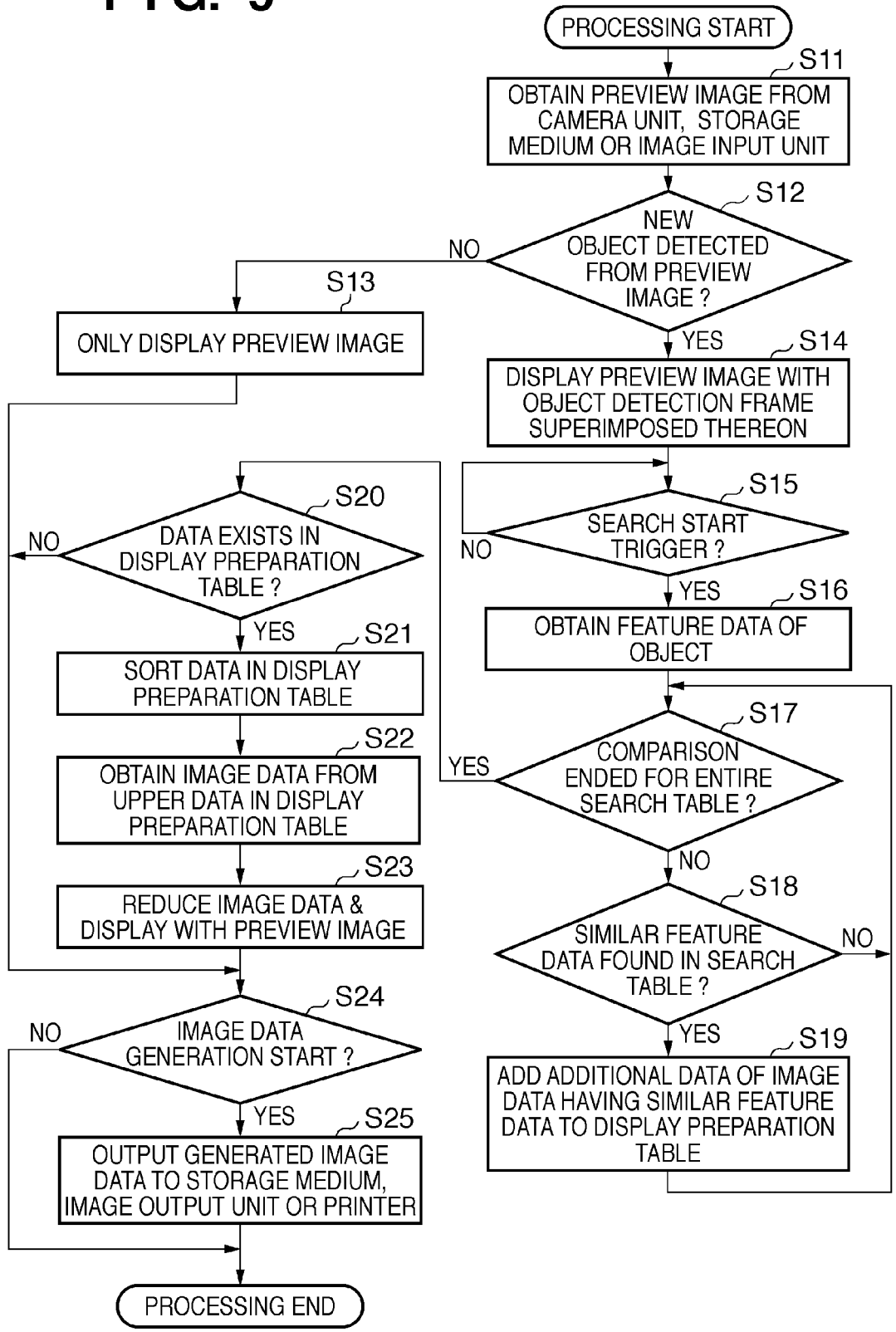
FIG. 5 is a flowchart describing a process according to the first embodiment.

FIG. 5 is a flowchart describing a process according to the first embodiment of retrieving image data having feature data similar to feature data of an object included in input image data, displaying the retrieved image data on the image output unit 109, and generating new image data. A program for executing this processing is stored in the program/data storage unit 113, and is executed under the control of the CPU 107.

Firstly, in step S11, target image data to be processed in order to generate an image is obtained from any one of the camera unit 101, the storage medium 104 and the image input unit 110. The obtained image data is then displayed as a preview image on the image output unit 109. If image data is input from the camera unit 101, the final image data is generated by a main shooting operation for recording the image data obtained from the camera unit 101 to the storage medium 104. Therefore, this stage is equivalent to a through-the-lens display state prior to the main shooting operation. If moving image data is input from the storage medium 104 via the recorder controller 103, the preview image is equal to a reproduction image, and generation of image data is equivalent to moving image capture that involves trimming still image data from moving image data that is being reproduced and recording the trimmed still image data to a storage medium. Also, in the case where image data is input from the image input unit 110, the downstream process is referred to differently depending whether the input source is a camera or a reproduction device. Incidentally, while the object handled in a preview image is often a person's face, the term "object" is used broadly in the following embodiments, without being particularly limited.

Next, the processing proceeds to step S12, and a process of detecting objects is performed on the preview image. This object recognition process is executed by the object recognition unit 105 (FIG. 1). If an object is not detected in step S12, the processing proceeds to step S13, and the preview image is directly displayed on the image output unit 109.

Figure 7A:
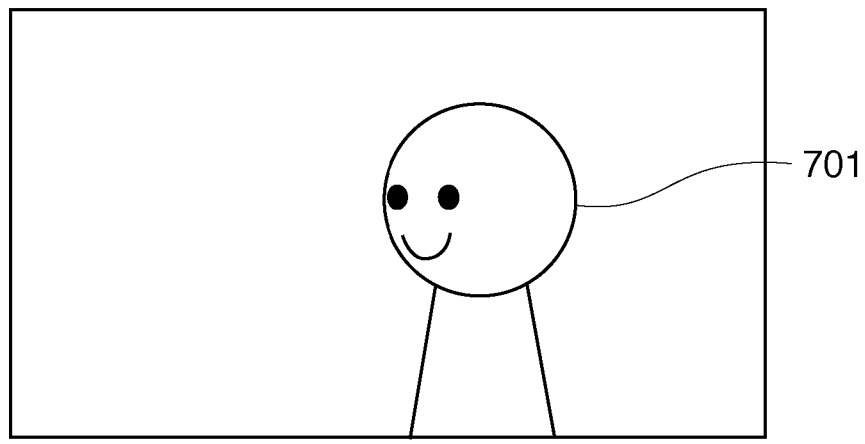
FIGS. 7A and 7B depict views illustrating examples of preview images displayed in S13 and S14.

FIG. 7A depicts a view illustrating an example of a preview image displayed in step S13 of FIG. 5. Reference numeral 701 denotes an object that was not correctly detected.

On the other hand, if an object is detected in step S12, the processing proceeds to step S14, and the preview image is displayed on the image output unit 109 after having an object detection frame superimposed thereon.

Figure 7B:
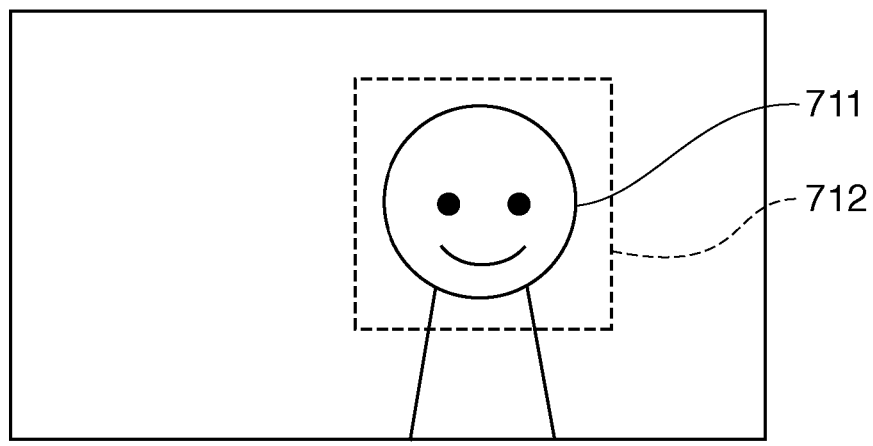

FIG. 7B depicts a view illustrating an example of a screen displayed in step S14 of FIG. 5. Reference numeral 711 denotes a detected object, and reference numeral 712 denotes the object detection frame.

Next, the processing proceeds to step S15, and it is determined whether a trigger for starting a search process has been input. As for this search start trigger, conceivable conditions include a search being unconditionally started when an object is detected, an instruction being received from the console unit 106 after an object has been detected, or an arbitrary object being selected using the console unit 106 after a plurality of objects have been detected. When a search is thus started, the processing proceeds to step S16, and feature data of the object is obtained from this preview image. Next, the processing proceeds to step S17, and the feature data of the object in the preview image obtained in step S16 is compared with the feature data in the search table created in advance in the RAM 111. The processing then proceeds from step S17 to step S18, and it is determined whether there is an object whose degree of similarity exceeds a prescribed threshold value. Here, if it is determined that there is an object whose similarity exceeds this threshold value, that is, image data similar to the image data of the object being displayed, the processing proceeds to step S19, where all of the additional data of the image data that includes the object is extracted from the search table in the RAM 111, and the extracted additional data is copied to a display preparation table in the RAM 111, after which the processing proceeds to step S17.

Since the data configuration of this display preparation table is similar to the aforementioned data configuration of the search table (FIG. 4), description thereof will be omitted.

Thus when, in step S17, comparison of the entire search table in the RAM 111 has ended, the processing proceeds to step S20, and it is determined whether there is additional data that has been copied to the display preparation table. If there is copied additional data, the processing proceeds to step S21, and if not, the processing proceeds to step S24. In step S21, the additional data of images in this display preparation table is sorted using set rules. Example sorting rules include the following, for example:

an order based on the degree of similarity with the featured data of one or more objects in the preview image (for example, descending order of the degree of similarity of feature data)

an order based on date information (for example, in order of most recent date)

an order based on a comparison of the composition of preview image with composition analysis data in the display preparation table (for example, in order of closest (most similar) composition).

Next, the processing proceeds to step S22, and image data is obtained based on the pointer 201 included in upper additional data of the sorted additional data. Next, the processing proceeds to step S23, and after a reduction process has been performed on the image data by the image processing unit 102, the reduced image data is combined with the preview image and displayed on the image output unit 109. At this time, the reduced images may be displayed in picture-in-picture format on the preview image, or may be displayed in a format that does not overlap the preview image after the preview image has also been reduced or trimmed in the image processing unit 102.

Figure 8A:
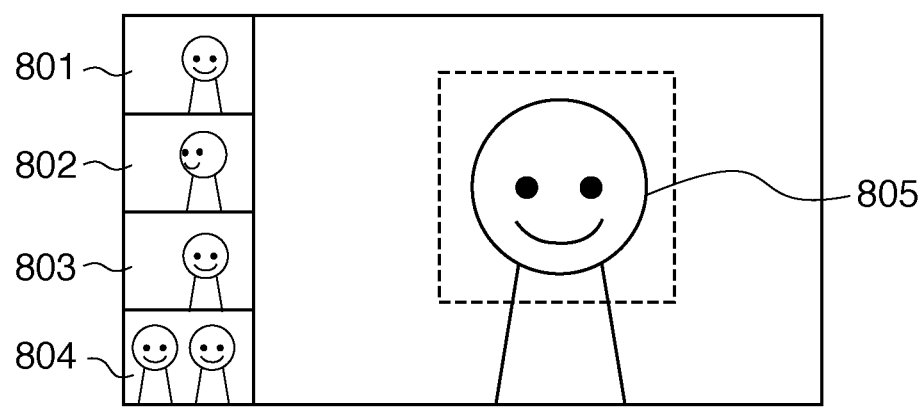
FIGS. 8A and 8B depict views illustrating examples of a screen display of reduced images in the first embodiment.

FIG. 8A depicts a view illustrating an example of a display displayed in step S23 in FIG. 5.

Reference numerals 801 to 804 denote reduced images of image data extracted based on a comparison with feature data of an object 805 in the preview image. At this time, the display format of the reduced images can also be changed so that similar images can be identified, based on a comparison of the preview image with data in the display preparation table. For example, comparison can be performed based on the degree of similarity with the feature image data of one or more objects in the preview image, based on date information, or based on a comparison of the composition of the preview image with the composition analysis data in the display preparation table. Methods such as displaying the frame border of similar reduced images with a bold line are conceivable.

Figure 8B:
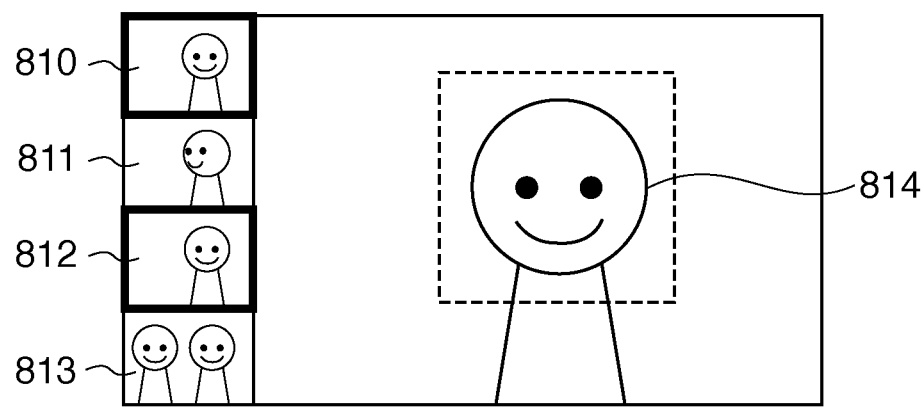

This example is shown in FIG. 8B. In FIG. 8B, reference numerals 810 to 813 denote reduced images of image data extracted based on a comparison with the feature data of an object 814 in the preview image, and are equivalent to the reduced images 801 to 804 in FIG. 8A. Of these, the images 810 and 812 have been determined, based on the composition analysis result, to approximate the composition of the object 814 in the preview image, so the frame of these images is displayed bolder than the frames of the other images, so as to be easily identifiable from other reduced images.

Finally, in step S24, it is determined whether image data generation start has been instructed by the console unit 106. If it is determined that image data generation start has been instructed, the processing proceeds to step S25. In step S25, after the image data input from the input source of image data forming the basis of the preview image has been processed by the image processing unit 102, the processing result is output to one of the storage medium 104, the image output unit 109, and the printer 115. Note that in the case where the input source of the image data here is the camera unit 101, shooting control for inputting image data obtained as a result of the main shooting in the camera unit 101 and recording the input image data to the storage medium 104 is performed. Also, when reproducing/displaying moving image data from the storage medium 104 as an image targeted for processing, trimmed still image data is recorded to the storage medium 104 as a result of receiving an instruction to trim a still image from the console unit 106.

Figure 6:
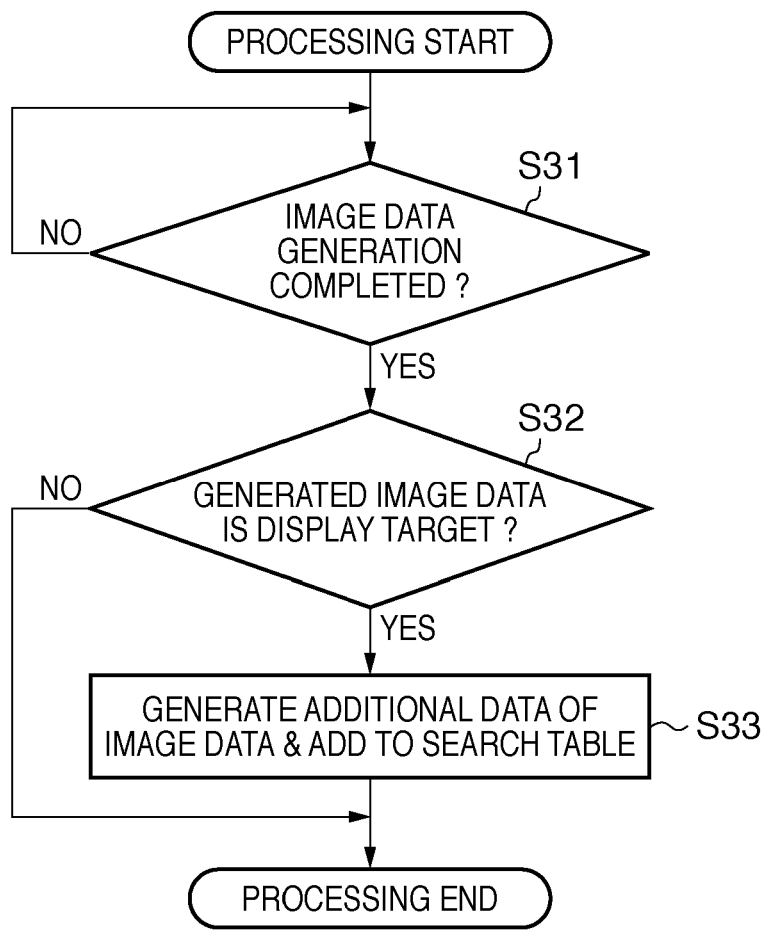
FIG. 6 is a flowchart describing a process of adding image data in the storage medium to the search table.

Note that in the case where the image data generated here is recorded to the storage medium 104, this image data can also be newly added to the search table using the procedure in FIG. 6.

FIG. 6 is a flowchart describing a process of newly adding image data to the search table, in the case where the image data is recorded on the storage medium 104. A program for executing this processing is stored in the program/data storage unit 113, and is executed under the control of the CPU 107.

Firstly, in step S31, it is determined whether generation of image data has been completed, and if it is determined to have been completed, the processing proceeds to step S32, where it is determined whether the generated image data is a display target. Conceivable judgment criteria include the image data including an object, or the date information in the additional data of the image data meeting a condition. If it is determined in step S32 that the image data is a display target, the processing proceeds to step S33, where additional data of the image data is created and added to the search table. Image data generated and added to the search table will also thereby be targeted for display when display of a preview image is subsequently performed.

According to the first embodiment as described above, it is possible, while shooting an object or creating still image data, to reference the object included in other image data that has already been recorded. Shooting of an image or creation of image data can thereby be performed with reference to image data of an object in the same composition as the object that is being shot or created, or with reference to related or similar image data.

Also, with the above configuration, by displaying reduced images of image data related to the object in order of similarity of composition with the targeted object or in order of shooting date, the relation between the object and related images can be easily identified.

A second embodiment of the present invention will be described next. The second embodiment will be described in the case where image data is grouped when displaying related image data. Note that since the configuration of an image processing apparatus according to the second embodiment, the data configuration of the storage medium, and the data configuration of the additional data and the search table are similar to the aforementioned first embodiment, description thereof will be omitted.

Figure 9:
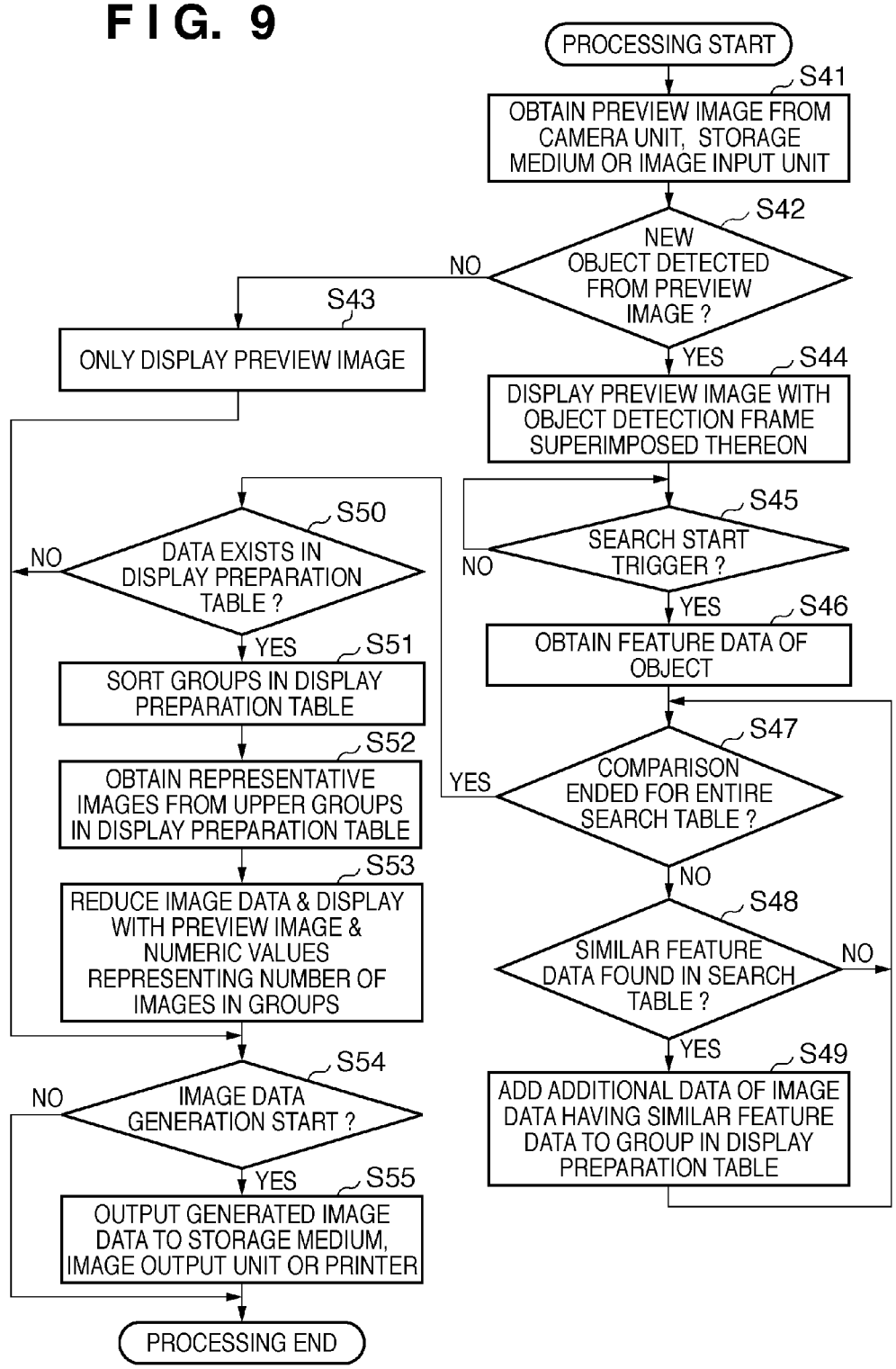
FIG. 9 is a flowchart describing a process according to a second embodiment.

FIG. 9 is a flowchart describing a process according to the second embodiment of comparing input image data and search data, displaying an image on the image output unit 109, and generating new image data. A program for executing this processing is stored in the program/data storage unit 113, and executed under the control of the CPU 107. Note that since the processing of steps S41 to S45 in FIG. 9 is the same as the aforementioned processing of steps S11 to S15 in the FIG. 5, description thereof will be omitted.

In step S46, feature data of the object is obtained from the preview image which results from displaying image data targeted for shooting or creation. Next, if the comparison process has not ended for the entire search table in step S47, the processing proceeds to step S48, and the feature data in the search table created in the RAM 111 is compared with the feature data of the object in the preview image derived in step S46. It is then determined whether the degree of similarity thereof exceeds a prescribed threshold value. If it is determined here that the threshold is exceeded, the processing proceeds to step S49, and all of the additional data of the image data having that degree of similarity is extracted from the search table and copied to the display preparation table in the RAM 111, after which the processing proceeds to step S47.

Figure 10:
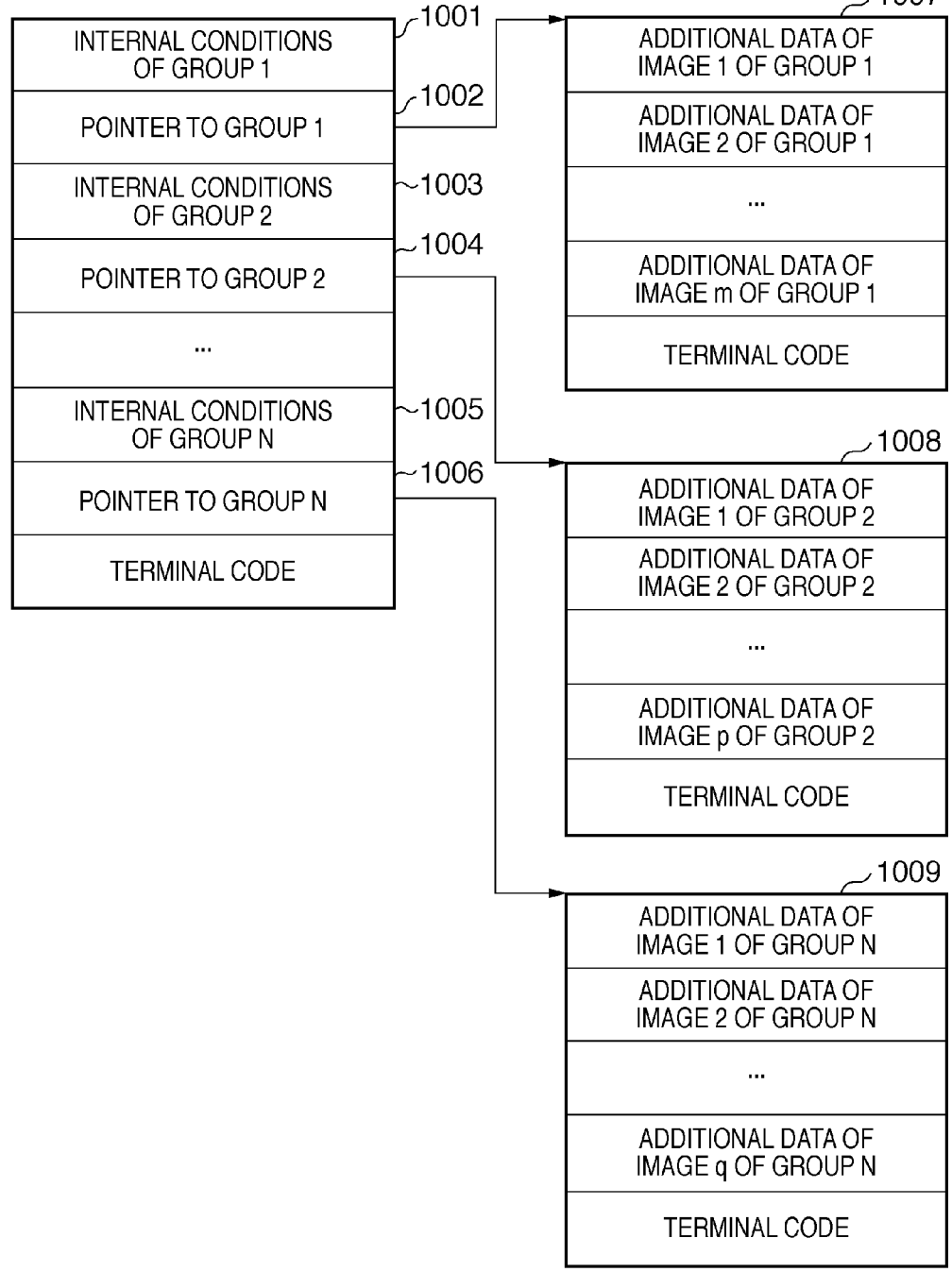
FIG. 10 depicts a view illustrating a data configuration of a display preparation table according to the second embodiment.

FIG. 10 depicts a view illustrating an example of the data configuration of the display preparation table according to the second embodiment.

This display preparation table has internal conditions 1001, 1003 and 1005 of the image data in the groups and pointers 1002, 1004 and 1006 indicating start addresses of group-specific tables. The group-specific tables 1007, 1008 and 1009 are comparable to the search table of the first embodiment in FIG. 4. Here, internal conditions include the number of object persons and the similarity of composition, for example. The table 1007 stores the additional data of images 1 to m included in a group 1. The table 1008 stores the additional data of images 1 to p included in a group 2. Further, the table 1009 stores the additional data of images 1 to q included in a group N.

When newly adding the additional data of image data to this display preparation table, firstly, it is determined which of the internal conditions of the groups this additional data meets. These internal conditions of the groups are determined based, for example, on the number of object persons, and the similarity of composition analysis data of the image data. In the case where additional data to be added does not belong to any of the groups, the table of a new group is provided, the data is stored in this group-specific table, and the internal conditions of this new group are further determined. On the other hand, in the case where additional data belongs to an existing one of the groups, the additional data is copied to this group-specific table, and it is also possible for the internal conditions of this group to be modified depending on the case.

Thus, in step S47, when comparison of the feature data of the object in the preview image with the additional data in the search table is determined to have ended, the processing proceeds to step S50. In step S50, it is determined whether additional data has been copied to the display preparation table. When there is not copied additional data, the processing proceeds to step S54, and if there is copied additional data, the processing proceeds to step S51, and the groups in this table is sorted using a predetermined rule. Conceivable sorting rules at this time include, for example, an order based on a comparison of the feature data of one or more objects in the preview image, date information, or the composition of the preview image with feature data, date information or composition information set in the internal conditions of each group. Here, the order of creation (shooting) dates, or descending order of similarity of composition are conceivable, for example.

Next, the processing proceeds to step S52, additional data of representative images is obtained from upper groups of the sorted groups, and the image data of the representative images is further obtained. In step S53, a reduction process is performed on the image data of the representative images by the image processing unit 102, and the reduced image data is then combined with the preview image and displayed on the image output unit 109. At the same time, the number of items of additional data included in those groups, that is, numeric values representing the number of images belonging to the groups are displayed together with the reduced images of the representative images. At this time, the reduced images may be displayed in picture-in-picture format on the preview image, or may be displayed in a format that does not overlap the preview image after the preview image has also been reduced or trimmed in the image processing unit 102.

Figure 11:
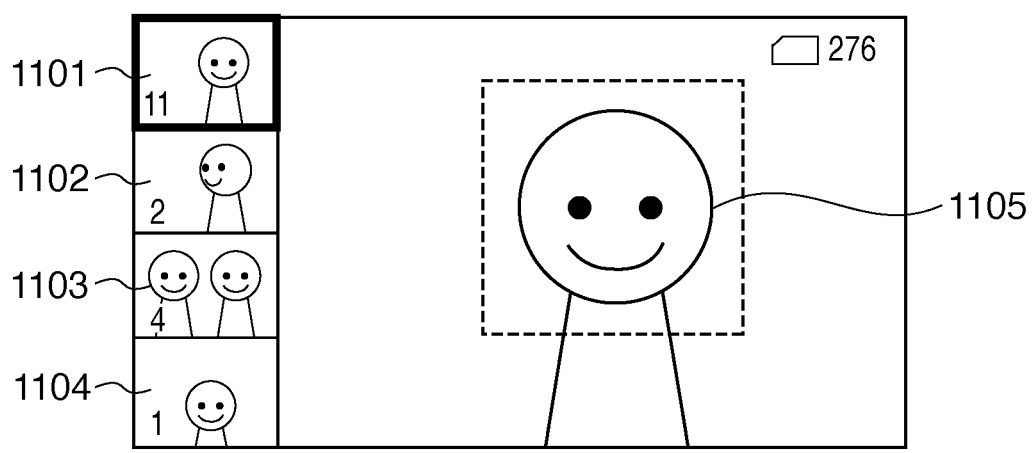
FIG. 11 depicts a view illustrating an example of a screen display according to the second embodiment.

FIG. 11 depicts a view illustrating an example of display according to the second embodiment.

Reference numerals 1101 to 1104 denote example display of reduced images of the representative images of groups extracted based on a comparison with the feature data of the object 1105 in the preview image, and numeric values representing the number of images in the groups. That is, the group indicated by the reduced image 1101 has eleven images, the group indicated by the reduced image 1102 has two images, the group indicated by the reduced image 1103 has four images, and the group indicated by the reduced image 1104 has one image. At this time, the display format of the reduced images can also be changed based on a comparison of the preview image with the groups in the display preparation table. The display format is, for example, changed so that similar objects are identifiable, based on a comparison of the feature data of one or more objects in the preview image, date information, or the composition of the preview image with feature data, date information or composition information set in the internal conditions of each group. Conceivable changes to the display format include, for example, displaying the frame border of a reduced image with a bold line. For example, in FIG. 11, the frame of a reduced image 1101 whose composition is the same as the composition of the preview image is displayed with a bold line.

Finally, the processing proceeds to step S54, and it is determined whether image data generation start has been instructed, according to an instruction from the console unit 106. Here, when generation of image data has been instructed, the processing proceeds to step S55, where image data from the input source of image data forming the basis of the preview image is processed by the image processing unit 102, and then output to one of the storage medium 104, the image output unit 109 and the printer 115.

According to the second embodiment as described above, effects such as the following are obtained in addition to the effects of the abovementioned first embodiment. Since reduced images of images that include an object targeted for shooting or creation are grouped by composition or number of objects, enabling display as reduced images for each group, image data related to an object can be easily identified.

Note that in the first and second embodiments, the start timing of reduced image display is assumed to be when an object of image data targeted for processing has been detected, or when the user operates a prescribed key of the console unit 106 after an object has been identified. The present invention may alternatively be configured such that the start timing is when a single object is selected by operation of the console unit 106, for example, in the case where a single image data includes a plurality of objects.

Also, in the case where a plurality of objects are identified in image data to be processed, image data that includes all of these objects may be retrieved, and reduced images thereof may be displayed. Alternatively, image data that includes these objects may be retrieved and reduced images of these retrieved image data may be displayed.

Also, the aforementioned determination in step S32 of FIG. 6 as to whether generated image data is a display target may be performed such that only data generated on the day on which the image processing apparatus is powered on or data generated after the image processing apparatus is powered on is targeted for display.

Display of reduced images according the second embodiment may be performed such that the reduced images are classified by the composition of image data or the number of objects, and displayed per classification together with the number of images. Also, the reduced images may be displayed in descending order of the number of images.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-147948, filed Jun. 22, 2009, which is hereby incorporated by reference herein in its entirety.

What is claimed is:

1. An image pickup apparatus comprising:
an image pickup unit;
an obtaining unit that sequentially obtains a series of image data continuously picked-up by the image pickup unit to display as preview images;
an extraction unit that extracts feature data of an object from the image data obtained by the obtaining unit;
a storage control unit that performs control to store image data into a storage unit;
a retrieval unit that retrieves, from image data stored in the storage unit, image data having feature data similar to the feature data extracted by the extraction unit;
a selection unit that selects, from a plurality of items of image data retrieved by the retrieval unit, image data to be displayed, based on additional data of each of the plurality of items of retrieved image data;
a display control unit that displays the image data selected by the selection unit together with the series of preview image data obtained by the obtaining unit; and
a shooting control unit that performs control such that a main shooting operation for storing image data obtained from the image pickup unit into a storage medium is executed upon receiving a shooting instruction, after display by the display control unit,
wherein the displayed image data selected by the selection unit represents a group of related images resulting from grouping the plurality of items of image data retrieved by the retrieval unit based on the additional data.

2. The image processing apparatus according to claim 1, wherein the additional data further includes at least one of a number of objects included in the image data, composition information of the image data, and creation date information of the image data.

3. The image processing apparatus according to claim 2, wherein the selection unit selects a prescribed number of image data in order of creation dates included in the additional data.

4. The image processing apparatus according to claim 2, wherein the selection unit selects a prescribed number of image data in descending order of compositions approximating the image data obtained by the obtaining unit, based on the composition information included in the additional data.

5. The image processing apparatus according to claim 2, wherein the selection unit selects a prescribed number of image data in descending order of degree of similarity of feature data included in the additional data with the feature data extracted by the extraction unit, based on the feature data included in the additional data.

6. The image processing apparatus according to claim 2, further comprising a grouping unit that groups the plurality of items of image data retrieved by the retrieval unit, based on the additional data,
wherein the selection unit selects, as the image data to be displayed, a representative image of a group resulting from the grouping.

7. The image processing apparatus according to claim 6, wherein the grouping unit performs grouping based on at least one of the number of objects included in the image data and the composition information of the image data that are included in the additional data.

8. The image processing apparatus according to claim 2, wherein the display control unit identifiably displays image data whose composition is similar to the image data obtained by the obtaining unit out of the selected image data, based on the composition information.

9. A method of controlling an image pickup apparatus having an image pickup unit, comprising:
sequentially obtaining a series of image data continuously picked-up by the image pickup unit to display as preview images;
extracting feature data of an object from the image data obtained in the obtaining step;
performing control to store image data into a storage medium;
retrieving, from image data stored in the storage medium, image data having feature data similar to the feature data extracted in the extraction step;
selecting, from a plurality of items of image data retrieved in the retrieval step, image data to be displayed, based on additional data of each of the plurality of items of retrieved image data;
a display control step of displaying the image data selected in the selection step together with the series of preview image data obtained in the obtaining step; and
a shooting control step of performing control such that a main shooting operation for storing image data obtained from the image pickup unit into a storage medium is executed upon receiving a shooting instruction, after display in the display control step,
wherein the displayed image data selected by the selection unit represents a group of related images resulting from grouping the plurality of items of image data retrieved by the retrieval unit based on the additional data.

10. A non-transitory computer-readable storage medium storing a program for causing a computer to function as an image pickup apparatus having an image pickup unit, including:
an obtaining unit that sequentially obtains a series of image data continuously picked-up by the image pickup unit to display as preview images;
an extraction unit that extracts feature data of an object from the image data obtained by the obtaining unit;
a storage control unit that performs control to store image data into a storage unit;
a retrieval unit that retrieves, from image data stored in the storage unit, image data having feature data similar to the feature data extracted by the extraction unit;
a selection unit that selects, from a plurality of items of image data retrieved by the retrieval unit, image data to be displayed, based on additional data of each of the plurality of items of retrieved image data;
a display control unit that displays the image data selected by the selection unit together with the series of preview image data obtained by the obtaining unit; and
a shooting control unit that performs control such that a main shooting operation for storing image data obtained from the image pickup unit into a storage medium is executed upon receiving a shooting instruction, after display by the display control unit,
wherein the displayed image data selected by the selection unit represents a group of related images resulting from grouping the plurality of items of image data retrieved by the retrieval unit based on the additional data.

11. An image processing apparatus, comprising:
an obtaining unit that obtains a moving image data to display as preview images;
an extraction unit that extracts feature data of an object from the moving image data obtained by the obtaining unit;
a storage control unit that performs control to store image data into a storage unit;
a retrieval unit that retrieves, from image data stored in the storage unit, image data having feature data similar to the feature data extracted by the extraction unit;
a selection unit that selects, from a plurality of items of image data retrieved by the retrieval unit, image data to be displayed, based on additional data of each of the plurality of items of retrieved image data;
a display control unit that displays the image data selected by the selection unit together with playing the preview moving image data obtained by the obtaining unit; and
a still image trimming unit that performs control such that still image data is recorded to a storage medium upon receiving a still image trimming instruction, after display by the display control unit,
wherein the displayed image data selected by the selection unit represents a group of related images resulting from grouping the plurality of items of image data retrieved by the retrieval unit based on the additional data.

12. The image processing apparatus according to claim 11, wherein the additional data further includes at least one of a number of objects included in the image data, composition information of the image data, and creation date information of the image data.

13. The image processing apparatus according to claim 12, wherein the selection unit selects a prescribed number of image data in order of creation dates included in the additional data.

14. The image processing apparatus according to claim 12, wherein the selection unit selects a prescribed number of image data in descending order of compositions approximating the image data obtained by the obtaining unit, based on the composition information included in the additional data.

15. The image processing apparatus according to claim 12, wherein the selection unit selects a prescribed number of image data in descending order of degree of similarity of feature data included in the additional data with the feature data extracted by the extraction unit, based on the feature data included in the additional data.

16. The image processing apparatus according to claim 12, further comprising a grouping unit that groups the plurality of items of image data retrieved by the retrieval unit, based on the additional data, wherein the selection unit selects, as the image data to be displayed, a representative image of a group resulting from the grouping.

17. The image processing apparatus according to claim 16, wherein the grouping unit performs grouping based on at least one of the number of objects included in the image data and the composition information of the image data that are included in the additional data.

18. The image processing apparatus according to claim 12, wherein the display control unit identifiably displays image data whose composition is similar to the image data obtained by the obtaining unit out of the selected image data, based on the composition information.

19. A method of controlling an image processing apparatus, comprising:
  an obtaining step of obtaining a moving image data to display as preview images;
  an extraction step of extracting feature data of an object from the image data obtained in the obtaining step;
  a storage control step of performing control to store image data into a storage unit;
  a retrieval step of retrieving, from image data stored in the storage unit, image data having feature data similar to the feature data extracted in the extraction step;
  a selection step of selecting, from a plurality of items of image data retrieved in the retrieval step, image data to be displayed, based on additional data of each of the plurality of items of retrieved image data;
  a display control step of displaying the image data selected in the selection step together with playing the preview moving image data obtained in the obtaining step; and
  a still image trimming step of performing control such that still image data is recorded to a storage medium upon receiving a still image trimming instruction, after display in the display control step,
  wherein the displayed image data selected by the selection unit represents a group of related images resulting from grouping the plurality of items of image data retrieved by the retrieval unit based on the additional data.

20. A non-transitory computer-readable storage medium storing a program for causing a computer to function as an image processing apparatus, including:
  an obtaining unit that obtains a moving image data to display as preview images;
  an extraction unit that extracts feature data of an object from the image data obtained by the obtaining unit;
  a storage control unit that performs control to store image data into a storage unit;
  a retrieval unit that retrieves, from image data stored in the storage unit, image data having feature data similar to the feature data extracted by the extraction unit;
  a selection unit that selects, from a plurality of items of image data retrieved by the retrieval unit, image data to be displayed, based on additional data of each of the plurality of items of retrieved image data;
  a display control unit that displays the image data selected by the selection unit together with playing the preview moving image data obtained by the obtaining unit; and
  a still image trimming unit that performs control such that still image data is recorded to a storage medium upon receiving a still image trimming instruction, after display by the display control unit,
  wherein the displayed image data selected by the selection unit represents a group of related images resulting from grouping the plurality of items of image data retrieved by the retrieval unit based on the additional data.

21. The image processing apparatus according to claim 1, wherein the image data selected by the selection unit includes information relevant to a number of images in the group of related images.

22. The image processing apparatus according to claim 21, wherein the information relevant to a number of images is a numeric value representing the number of images in the group of related images.

23. The image processing apparatus according to claim 1, wherein the display control unit displays a plurality of items of image data selected by the selection unit together with the series of image data obtained by the obtaining unit,
  wherein each of the plurality of items of image data displayed by the display control unit is a representative image of each group of related images.

* * * * *